United States Patent
Sullivan

(10) Patent No.: US 6,201,817 B1
(45) Date of Patent: Mar. 13, 2001

(54) MEMORY BASED BUFFERING FOR A UART OR A PARALLEL UART LIKE INTERFACE

(75) Inventor: Ronald Sullivan, Elgin, IL (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/086,390

(22) Filed: May 28, 1998

(51) Int. Cl.[7] .................................................. H04Q 3/00
(52) U.S. Cl. ............................................ 370/463; 370/522
(58) Field of Search .................................... 370/463, 476, 370/522; 340/825.06, 825.1

(56) References Cited

U.S. PATENT DOCUMENTS

| 4,210,780 | 7/1980 | Hopkins et al. |
| 4,231,087 | 10/1980 | Hunsberger et al. |
| 4,626,844 | * 12/1986 | Mann et al. ............... 340/825.31 |
| 4,809,269 | * 2/1989 | Gulick ............................ 370/94 |
| 5,761,422 | 6/1998 | Westin . |
| 5,781,598 | 7/1998 | Hardy, III . |

* cited by examiner

Primary Examiner—Melvin Marcelo
(74) Attorney, Agent, or Firm—McDonnell Boehnen Hulbert & Berghoff

(57) ABSTRACT

A system linking a serial interface with a processor that is parallel in nature is described. A system memory having a receive buffer stores data from a UART destined for processing by a central processing unit. A control state machine interrupts the central processing unit to initiate processing of the data in the receive buffer when the receive buffer reaches a certain state, such as storing a full frame of data. Command characters indicative of control conditions in the data stream are detected by discrete hardware in a receive command processor, and the memory address in the receive buffer is forwarded to the central processing unit. The resulting system substantially improves the speed and efficiency of the transfer of data between the UART and the central processing unit.

17 Claims, 1 Drawing Sheet

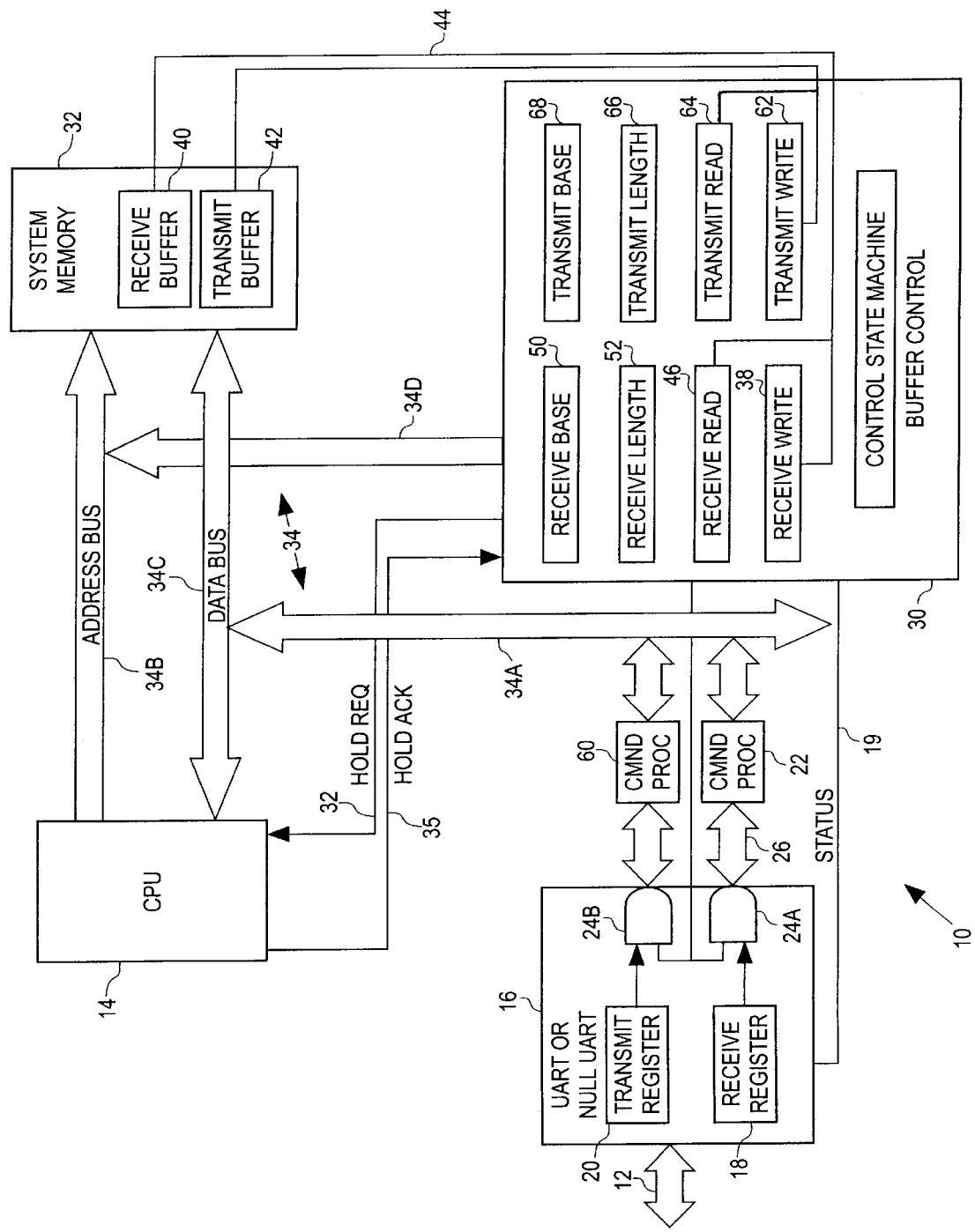

MEMORY BASED BUFFERING FOR A UART OR A PARALLEL UART LIKE INTERFACE

BACKGROUND OF THE INVENTION

A. Field of the Invention

This invention relates to the field of data processing in a telecommunications system, and more particularly to a system providing an interface between a serial communications link and a processor that is parallel in nature, such as a modem's central processing unit.

B. Description of Related Art and Advantages of the Invention

One piece of equipment often used in telecommunications systems is a UART, or Universal Asynchronous Receiver Transmitter. The UART is a device which interfaces a serial communications link to a microprocessor. When receiving data, the UART converts the serial link data (i.e., bits) into parallel data (i.e., bytes, words, etc.), which is then transferred to the microprocessor. When transmitting data, the UART converts parallel data from the processor into serial data.

UARTs are used in a variety of different types of telecommunications systems, including modems. In this example, the serial communication link may be an RS-232 serial cable connected to a data terminal equipment (DTE) and a data communications equipment (DCE), and the processor is a central processing unit (CPU) for the modem, such as a digital signal processor (DSP).

The efficiency overhead time spent by the DSP to service the UART's transmit(TX)/receive(RX) requests of the interface between the UART and the processor is critical for the overall performance of the system. Originally, the UART only had a storage capacity of one or two characters as received from the serial link, or transmitted by the CPU. When a character was received, the UART stored it in a temporary register (buffer). The UART either informed the processor that a character was read by issuing an interrupt signal to the processor, or the processor constantly polled (i.e., checked a data available status bit) the UART. Likewise, a single character buffer was found at the transmit (TX) side. This approach worked well until serial communication rates and processor workloads increased. The single character buffer was no longer sufficient. In particular, the "overhead" time spent by the CPU to store/retrieve characters from the UART of processor time per character was greater than the time to send the actual data on the serial link.

Consequently, a second prior art method was devised to reduce the average UART overhead. This method introduced an N-character deep first-in, first-out (FIFO) buffer in the UART. The processor was no longer interrupted on a character by character basis, but rather was interrupted every time the FIFO buffer collected N-characters. This method reduced average overhead more than the first method, but still required the processor to perform the task of moving the data from the UART into its own local memory, as well as requiring the UART to contain an embedded fixed depth local FIFO storage unit for the data to be TX'd/RX'd by the UART. With the advent of even higher communication rates and faster CPUs, this second method has also proven to be also inefficient.

Secondly, there is a need to detect special characters embedded within the data stream. Prior art methods provided for this detection through software means only. That is to say, the software controlling the UART must spend additional time/processing power to parse the data stream to determine if special characters are present.

This invention provides for a more efficient detection via a discrete hardware processing unit found within the UART. Characters can be specified through programmable registers found within the UART to provide additional flexibility in character choices.

The present invention provides a method and system for coupling the UART to the processor in a manner in which the processor is no longer involved in the data transfer from the UART to the processor, therefore it substantially reduces overhead on the processor. In addition, the invention no longer requires a fixed depth FIFO buffer arrangement embedded in the UART. As such, the present invention provides a much more efficient arrangement for transferring data between a serial communications link and a processor, allowing the entire system to operate at significantly faster rates than that obtained with known prior art methods. Further, a receive channel is provided in which control characters indicative of special control conditions are detected in a discrete hardware processing unit, not by the system processor. This further off-loads a substantial computational burden from the processor, enabling much higher data transfer rates between the UART and the processor.

SUMMARY OF THE INVENTION

In one aspect of the invention, a system provides an interface between a serial communications link and a processor. The system includes a transmit register and a receive register, the transmit register and receive register respectively transmitting and receiving data to and from the serial communications link. The transmit and receive registers can either be of the form of a serial shift register (as in the case of a UART), or in the form of a parallel register in which data bits are grouped into blocks (i.e, bytes, words) and these list block groups locked in parallel directly by a remote host system (as in the case of a null UART).

A system memory coupled to the transmit and receive registers and to the processor is also provided. The system memory includes a receive buffer providing temporary data storage and a transmit buffer. A receive register command processor, coupled to the receive register, is also provided for detecting the presence of a control character or characters in the incoming data stream associated with communication control conditions and identifying where in the data stream such control character or characters occurred.

A control state machine is also provided that is coupled to the system memory and the receive command processor. The control state machine is responsive to the receive register command processor to coordinate the transfer of blocks of data in the incoming data stream from the receive register to the receive buffer in the system memory.

The control state machine further comprising a means for monitoring the status of the receive buffer, such as whether the receive buffer is full or contains a full frame of data from the serial communications link. The control state machine issues a first interrupt signal to the processor to initiate retrieval of data in the receive buffer and processing of the data when the receive buffer is filled to a predetermined amount (such as containing a frame of data). The control state machine further issues a second signal to the processor or otherwise indicates to the processor the location in the receive buffer where the control character or characters associated with said communication control condition are located.

In the above system, the efficiency of transfer of data from the serial communication link and the processor may be improved. In particular, the processor is not involved in the data transfers: this is taken over by the receive command processor and the control state machine. Additionally, there is no temporary FIFO buffer required at the receive register, since a single system memory is provided which directly receives the data from the receive register. Further, the overhead of the processor is reduced as compared to prior art methods.

In another aspect of the invention, the control state machine further comprises a receive write pointer identifying a location in the receive buffer and the control state machine transfers a character from the receive register to a location in the receive buffer identified by the receive write pointer. The control state machine increments the receive write pointer such that a subsequent character from the receive register is stored in a subsequent memory location in the receive buffer. In this manner, the control state machine can monitor the fullness of the receive buffer and initiate an interrupt to the processing unit when the receive buffer has a full frame of data in it.

In a modem embodiment of the invention, the control signals that are detected in hardware in the receive channel command processor are modem control conditions such as Flow Control Escape or AT commands, and so forth. By off-loading the detection of these commands to the receive channel command processor, instead of implementing them in the system processor, the overhead in the processor is reduced.

While the above summary describes how the system works in the receive direction (i.e., from the receive register to the processor), in another aspect of the invention improved efficiencies are also provided in the transmit direction. In particular, the system may further comprise a transmit command processor coupled to the control state machine and to the transmit register in the system memory. The processor transfers data to be transmitted from the processor to the serial communication link to the transmit buffer in the system memory. Further, the control state machine monitors the status of the transmit buffer and coordinates the transfer of data in the transmit buffer to the transmit command processor when the data (such as a frame of data) is ready to be transmitted.

In this latter aspect of the invention, the processor may insert characters indicative of special transmit commands or control conditions into the transmit buffer and identify for the control state machine the address in the transmit buffer where the special transmit commands or control characters are located. When the data in the transmit buffer is transferred to the transmit command processor, the control state machine instructs the transmit command processor how to proceed when the address in the transmit buffer associated with the transmit command characters is accessed.

These, and many other features, objects and advantages of the invention will become more apparent from the following detailed description of a presently preferred embodiment of the invention.

BRIEF DESCRIPTION OF THE DRAWING

The FIGURE is a detailed block diagram of a presently preferred system that implements the invention, showing the UART (or Null UART), Control State Machine, System Memory, and CPU, i.e., the processor that is parallel in nature and which operates on data sent to and received from the UART.

DETAILED DESCRIPTION OF THE PREFERRED EMBODIMENT

Referring now to the FIGURE, a system is illustrated in block diagram form that provides an interface between a serial communications link 12 and a processor or CPU 14 that is parallel in nature. The system includes a UART or Null UART 16 that is connected to the serial communications link 12. The UART 16 performs the serial-to-parallel and parallel-to-serial conversions in known manner. Incoming data converted to parallel form is stored in a receive register 18 for subsequent transfer to the CPU 14. Outgoing data from the CPU 14 is stored in a transmit register 20. The transmit and receive registers thus store data to and from said serial communications link 12.

The receive register 18 consists of a serial shift register (in the case of a real UART) or a host writeable parallel register (in the case of a null UART), which contains the data received from the complementary serial device via the serial communications link 12. The transmit register 20 likewise consists of a serial shift register (in the case of a real UART) or a host readable parallel register (in the case of a null UART), which contains the data from the processor 14 destined for transmission to the complementary serial device via the serial communications link 12.

The system 10 further includes a receive register command processor 22 that is coupled to the receive register 18 via an AND gate 24A and a bus 26. Data is received in the receive register 18 either locally by serial receive circuitry in the UART 16 or directly from a remote host (not shown). Once data is available in the receive register 18, a control state machine 30 (described below) is alerted by a signal on the status bus 19 and transfers the data from the receive register 18 to the receive command processor 22.

The receive register command processor 22 detects the presence of a control character or characters in the incoming data stream associated with control conditions in the stream of data from the serial communications link 12, such as Software Flow Control, Errors, or AT modem commands. This is performed using known techniques. The receive register command processor 22 also identifies where in the data stream such control character or characters occurred. The receive register command processor 22 can be implemented as an application specific integrated circuit (ASIC).

The system further includes control state machine 30 and a system random access memory 32 having portions thereof designated as a receive buffer 40 and a transmit buffer 42. The control state machine 30 coordinates the transfer of data between the receive and transmit registers 18 and 20 of the UART 16 and the system memory 32, and issues interrupt signals to the processor 14 to retrieve frames of data from the system memory 32 for processing. Further, the control state machine monitors the status of the receive and transmit buffers 40 and 42 of the system memory so that the system is operating at maximum efficiency, e.g., that the processor 14 is interrupted to retrieve data from the receive buffer 40 when the buffer 40 contains a full frame of data. The control state machine 30 may comprise a separate ASIC that implements in software the functions and routines that are described below, or otherwise.

The system 10 also includes a bus network 34 comprising a main bus 34A, a system memory address bus 34B, a system memory data bus 34C, and a control state machine address bus 34D. The control state machine 30 is responsive to the receive register command processor 22 and the receive register 18 to coordinate the transfer of blocks of data in the incoming data stream from the receive register 18 to the receive buffer 40 in the system memory 32 via the main bus 34A and the data bus 34C.

The control state machine 30 further includes a pointer 38 (Receive Write in the FIGURE) that monitors the status of the receive buffer 42 (as indicated by the line 44). Characters are passed through the command processor 22 into a buffer control section of the control state machine 30. When a character is ready to be written to the receive buffer 40, the buffer control section puts the processor 14 into a hold condition and takes over the access into the system memory 32. The character is stored directly into the system memory 32 at an address pointed to by the Receive Write pointer 38. After the character is written into the memory 40, the pointer 38 is incremented. If the resulting address is above the maximal address allocated in the system memory to the receive buffer 40, the pointer 38 is wrapped around back to the beginning of the buffer 40. The Receive Write pointer 38 is thus a "head"(e.g., input of FIFO-like circular buffer) pointer: data is always written to the location pointed to by the pointer 38. Conversely, when the processor 14 reads data from the receive buffer 40, it reads data from the "tail"(e.g., output of FIFO-like circular buffer) of the buffer, that is, the location pointed to by the "tail pointer" or Receive Read pointer 46. The buffer control routine in the control state machine 30 maintains both pointers 38 and 46, and reports any overflow to the processor 14 via an error interrupt.

The Receive Base 50 is a stored parameter in the control state machine 30 indicating the address location in the system memory 32 where the receive buffer 30 begins. Receive Length 52 is a stored parameter indicating the size or number of bytes/words in the system memory 32 allocated to the receive buffer 40.

The receive channel comprising receive register 18, receive command processor 22, control state machine 30 and system memory 32 is implemented as follows. After the control state machine 30 is alerted to incoming data in the receive register 18, the data is transferred to the receive command processor 22. Once a character is processed by the receive command processor 22, the control state machine 30 requests control of the main bus 34A by issuing a hold request signal 33 to the processor 14. The processor 14 relinquishes the bus 34A and informs the control state machine 30 by issuing a hold acknowledgement signal 35. When the hold acknowledgement signal 35 is asserted, the control state machine 30 transfers the character directly to the receive buffer 40 in the system memory 32 via busses 34A, 34C at the location specified by the receive write pointer 38. The control state machine 30 then increments the receive write pointer 38 emulating a "circular" buffer starting at the Receive Base 50 address and having a length of Receive Length 52.

The control state machine 30 issues an interrupt signal to the processor 14 to initiate retrieval of data in the receive buffer 40 when appropriate. Whereas in the prior art this was done on a character by character basis, or when a FIFO buffer was filled in the UART, the present system only interrupts the processor 14 when certain specified conditions or fullness of the receive buffer 40 are met, such as an entire frame of data has been received, processed by the receive command processor 22 and stored in the receive buffer 40. The processor 14 is not involved in moving the data from the UART 16 into its own memory, as that function has been entirely replaced by the control state machine 30.

Further, the processor 14 is not involved with the processing of characters to determine whether there are any indicating special control conditions, as that processing has been off-loaded to separate hardware in the receive command processor 22. Specifically, the command processor 22 detects these characters or conditions, and informs the control state machine 30 where in the data stream these characters occurred. This information is later transmitted to the processor 14 by a special interrupt signal to the processor 14 on the system bus 34A indicating the block address in the system memory 32 of such control characters. The processor 14 then responds appropriately to these characters as it processes the blocks of data from the receive buffer 40. This method of off-loaded hardware detection of control conditions substantially reduces the burden on the processor 14 and permits much higher data transfer rates from the UART 16 to the processor 14.

In one representative embodiment of the invention, the UART 16 and processor 14 are implemented in a modem. The UART 16 receives serial data from data termination equipment (DTE) and the processor 14 comprises a modem central processing unit (CPU) implemented as a digital signal processor (DSP). The control signals detected by the receive command processor 22 may comprise modem control conditions. Representative modem control conditions are Break, Errors, Flow Control, and AT commands.

The system 10 further includes a transmit channel comprising the transmit register 20, and a transmit command processor 60 coupled between the control state machine 30 and the transmit register 30. The system memory 32 includes a transmit buffer 42 for storing data after processing by the processor 14 and destined for the UART 16 and serial communications link 12.

The control state machine 30 monitors the status of the transmit buffer 42 by means of a transmit read and write pointers 62 and 64. The control state machine 30 coordinates the transfer of data in the transmit buffer 42 to the transmit command processor 60 when the transmit write pointer 62 indicates that data is ready to be transmitted. The stored parameters Transmit Base 68 and Transmit Length 66 indicate the memory address in the system memory 32 at which the transmit buffer begins; and the size of the buffer 42, respectively. The "head" or transmit write pointer 62 of the transmit buffer 42 is used by the processor 14 to store characters to be transmitted into the memory 32. The "tail" or transmit read pointer 64 is used by the buffer control routine of the control state machine 30 to transfer the character from the transmit buffer 42 to the UART transmit register 20.

The transferring of data from the system memory 32 to the UART 16 is as follows. The processor 14 prepares the data to be transmitted and stores it the memory area in the system memory 42 pointed to by the Transmit Read pointer 64 and the Transmit Write pointer 62. Once data is ready to be transferred to the UART, as is the case when the Transmit Write pointer 62 is different from the Transmit Read pointer 64, the control state machine 30 requests control of the system bus 34 by asserting a hold request 33. After the control state machine 30 receives a hold acknowledgement 35 from the processor 14, the data is transferred from the transmit buffer 42 in the system memory 32 via the busses 34C, 34A to the transmit command processor 60, and from there to the transmit register 20. The Transmit Read pointer 64 is then incremented as a circular buffer pointer in the maimer described above.

Using the above techniques, the processor 14 is able to insert characters indicative of special conditions, for example modem flow control conditions, into the data stream. The processor 14 transmits commands or characters into the transmit buffer 42 and identifies the address in the transmit buffer 42 where the special transmit commands or characters are located. As data is being transferred from the transmit buffer 42 to the transmit command processor 60, the control state machine 30 monitors the memory addresses being accessed. The control state machine 30 then can responsively instruct the transmit command processor 60 how to proceed when the address in the transmit buffer 42 associated with the block where the special characters are accessed.

From the above discussion, it can seen that a method of processing data between a serial communications link and a processor has been described, comprising the steps of:

1) receiving the incoming data in a receive register 18;
2) transferring the data to a receive command processor 22,
3) detecting with the command processor the presence of a control character or characters in the incoming data associated with a communication control condition;
4) transferring the data from the command processor 22 into a receive buffer 40 in a system memory 32 and storing the location in the receive buffer 40 where the control character or characters are located;
5) interrupting the processor 14 to process data from the receive buffer 40 when a predetermined condition is present in the receive buffer 40 (such as a full frame of data has been received, the buffer is full, or otherwise); and
6) indicating to the processor the location in the transmit buffer where the control character or characters are stored. Using the above method, the processor may operate on blocks of data stored in the system memory in an efficient manner since the detection of control characters is off-loaded to separate hardware and the processor is interrupted only when a suitable block of data is ready for processing. Further, the task of transferring data from the UART to the processor memory is not done by the processor, it is off-loaded to the control state machine.

In the transmit direction, the above method can be further practiced in a preferred embodiment by implementing the additional steps of storing transmit data to be transmitted from the processor to the serial communications link in a transmit buffer in the system memory, and transmitting data in the transmit buffer to a transmit command processor. The system processor identifies the address in the transmit buffer where a special character or characters indicative of special transmit conditions are present in the data. The transmit command processor then may take a variety of action when the memory address associated with the special characters is accessed. For example, the transmit command processor 60 may responsively insert predetermined control data into the data stream for transmission onto said serial communications link, under the supervision of the control state machine 30 or otherwise.

While the invention has been described in conjunction with presently preferred embodiments of the invention, persons of skill in the art will appreciate that various modifications which can be made to the disclosed embodiment without departure from the true scope and spirit of the invention. While the invention has been described in the context of a modem, the particular nature of the serial link and the system processor is not important for purposes of the present invention, as it is applicable to a wide variety of other applications. This true scope and spirit is defined by the appended claims, interpreted in light of the foregoing.

I claim:

1. A system providing an interface between a serial communications link and a processor, comprising:
   a) a transmit register and a receive register, said transmit register and receive register respectively transmitting and receiving data to and from said serial communications link;
   b) a system memory comprising a transmit buffer and a receive buffer, said system memory coupled to said processor;
   c) a receive register command processor, coupled to said receive register, for detecting the presence of a control character or characters in said incoming data stream associated with communication control condition in said stream of data from said serial communications link and identifying where in said data stream such control character or characters occurred; and
   d) a control state machine coupled to said system memory and said receive command processor, said control state machine responsive to said receive register command processor to coordinate the transfer of blocks of data in said incoming data stream from said receive register to said receive buffer in said system memory, said control state machine further comprising a means for monitoring the status of said receive buffer;
      1) wherein said control state machine issues a first signal to said processor to initiate retrieval of data in said receive buffer and processing of said data in said receive buffer when said receive buffer is filled to a predetermined amount, and
      2) wherein said control state machine issues another signal to said processor indicating the location in said receive buffer where said control character or characters associated with said communication control condition is located,
   whereby the efficiency of transfer of data from said serial communication link and said processor may be improved.

2. The system of claim 1, wherein said processor comprises a central processing unit for a modem.

3. The system of claim 1, wherein said control state machine further comprises a receive write pointer identifying a location in said receive buffer, and wherein said control state machine (a) transfers a character from said receive register to a location in said receive buffer identified by said receive write pointer and (b) increments said receive write pointer such that a subsequent character from said receive register is stored in a subsequent memory location in said receive buffer.

4. The system of claim 2, wherein said predetermined amount of fullness in said receive buffer comprises a frame of data received from serial communications link.

5. The system of claim 2, wherein said control signals associated with communication control conditions that arc detected by said command processor comprise modem control conditions.

6. The system of claim 5, wherein said modem control conditions are selected from the group consisting of Break, Errors, Flow Control, and AT commands.

7. The system of claim 1, wherein said system further comprises a transmit command processor coupled to said control state machine and to said transmit register, and wherein said system memory further comprises a transmit buffer, said processor transferring data to be transmitted from said processor to said serial communication link to said transmit buffer, and wherein said control state machine further comprises a means for monitoring the status of said transmit buffer and coordinates the transfer of data in said transmit buffer to said transmit command processor when said means for monitoring indicates that data is ready to be transmitted.

8. The system of claim 7, wherein said processor inserts characters indicative of special transmit commands into said transmit buffer and identifies the address in said transmit buffer where said special transmit commands are located, said control state machine responsively instructing said transmit command processor how to proceed when said address in said transmit buffer is accessed.

9. A method of processing incoming data between a serial communications link and a processor, comprising the steps of:

receiving said incoming data in a receive register;

transferring said data to a command processor, detecting with said command processor the presence of a control character or characters in said incoming data associated with a communication control condition;

transferring said data from said command processor into a receive buffer in a system memory and storing the location in said receive buffer where said control character or characters are located;

interrupting said processor to process data from said receive buffer when a predetermined condition is present in said receive buffer; and indicating to said processor the location in said transmit buffer where said control character or characters are stored, whereby said processor may operate on blocks of data stored in said system memory in an efficient manner.

10. The method of claim 9, further comprising the steps of:

storing transmit data to be transmitted from said processor to said serial communications link in a transmit buffer, transmitting data in said transmit buffer to a transmit command processor;

said processor identifying the address in said transmit buffer where a special character or characters indicative of special transmit conditions are present in said data transmitted to said transmit command processor, said transmit command processor responsively inserting predetermined control data into said transmit data associated with said special characters; and transferring said data and control data from said transmit command processor to a transmit register for transmission onto said serial communications link.

11. A modem performing the method of claim 9.

12. The method of claim 10, wherein said receive register and said transmit register comprise a serial Universal Asynchronous Receiver Transmitter (UART).

13. The method of claim 10, wherein said receive register and said transmit register comprise a non-serial Universal Asynchronous Receiver Transmitter (NULL UART) pair of devices.

14. A modem comprising:

an interface for connecting said modem to a communications link;

a central processing unit for processing data between a data terminal equipment coupled to said modem and said communications link, and a system coupling said data terminal equipment and said central processing unit, the system comprising:

a) a UART or null UART comprising a transmit register and a receive register, said transmit register and receive register in communication with said data terminal equipment;

b) a system memory comprising a transmit buffer and a receive buffer, said system memory coupled to said central processing unit;

c) a receive register command processor, coupled to said receive register, for detecting the presence of a control character or characters in said incoming data stream associated with a communication control condition in said stream of data and identifying where in said data stream such control character or characters occurred;

d) a control state machine coupled to said system memory and said receive command processor, said control state machine responsive to said receive register command processor to coordinate the transfer of blocks of data in said incoming data stream from said receive register to said receive buffer in said system memory, said control state machine further comprising a means for monitoring the status of said receive buffer;

1) wherein said control state machine issues a first signal to said central processing unit to initiate retrieval of data in said receive buffer and processing of said data in said receive buffer when said receive buffer is filled to a predetermined amount, and 2) wherein said control state machine issues a second signal to said processor indicating the location in said receive buffer where said control character or characters associated with said communication control condition is located, whereby the efficiency of transfer of data from said data terminal equipment to said central processing unit may be improved.

15. The modem of claim 14, wherein said predetermined amount of fullness in said buffer comprises a frame of data, whereby said central processing unit is interrupted to retrieve and process a frame of data at a time.

16. The system of claim 1, wherein said predetermined amount of fullness in said buffer comprises a frame of data from said serial communications link, whereby said processor is interrupted to retrieve and process a frame of data at a time.

17. The method of claim 9 wherein said predetermined condition in said receive buffer comprises a frame of data from said serial communications link, whereby said processor is interrupted to retrieve and process a frame of data at a time.

* * * * *